United States Patent
Kuisle et al.

(10) Patent No.: US 10,086,454 B2
(45) Date of Patent: Oct. 2, 2018

(54) DEVICE FOR SETTING SAW BLADES

(71) Applicant: GEORG KESEL GMBH & CO. KG, Kempten (DE)

(72) Inventors: Martin Kuisle, Bidingen (DE); Martin K. Klug, Haldenwang (DE)

(73) Assignee: GEORG KESEL GMBH & CO. KG, Kempten (DE)

( * ) Notice: Subject to any disclaimer, the term of this patent is extended or adjusted under 35 U.S.C. 154(b) by 48 days.

(21) Appl. No.: 15/277,006

(22) Filed: Sep. 27, 2016

(65) Prior Publication Data

US 2017/0087652 A1    Mar. 30, 2017

(30) Foreign Application Priority Data

Sep. 29, 2015   (DE) .......................... 10 2015 116 498

(51) Int. Cl.
*B23D 63/04*   (2006.01)

(52) U.S. Cl.
CPC .................................. *B23D 63/04* (2013.01)

(58) Field of Classification Search
CPC ...................................................... B23D 63/04
USPC ............................................... 76/61, 58, 112
See application file for complete search history.

(56) References Cited

U.S. PATENT DOCUMENTS

| | | | | |
|---|---|---|---|---|
| 2,109,161 A | * | 2/1938 | Biro | B23D 63/04 76/61 |
| 2,356,448 A | * | 8/1944 | Daggett | B23D 63/04 76/62 |
| 3,564,941 A | * | 2/1971 | Aijala | B23D 63/04 76/66 |

FOREIGN PATENT DOCUMENTS

| | | | |
|---|---|---|---|
| DE | 19959458 A1 | 6/2001 | |
| EP | 0742067 A1 | * 11/1996 | ............. B23D 63/04 |

* cited by examiner

*Primary Examiner* — Omar Flores Sanchez
(74) *Attorney, Agent, or Firm* — Notaro, Michalos & Zaccaria P.C.

(57) ABSTRACT

A device for setting saw blades has a housing, a setting device connected to the housing for setting a saw blade, a clamping device connected to the housing for clamping the saw blade, and a drive unit connected to the housing for driving the setting device and the clamping device. The setting device has saw set holders which are arranged on either side of the saw blade, are pivotable relative to one another and can be fitted with saw sets. The clamping device has clamping jaw holders which are arranged on either side of the saw blade, can be adjusted relative to one another and can be fitted with clamping jaws. In order to provide a device of the kind described above, which securely clamps the saw blade, the clamping jaw holders are designed so as to be pivotable relative to one another.

11 Claims, 4 Drawing Sheets

DEVICE FOR SETTING SAW BLADES

The present invention relates to a device for setting saw blades, comprising: a housing; a setting device connected to the housing for setting a saw blade; a clamping device connected to the housing for clamping the saw blade; and a drive unit connected to the housing for driving the setting device and the clamping device, the setting device having saw set holders which are arranged on either side of the saw blade, are pivotable relative to one another and can be fitted with saw sets, and the clamping device having clamping jaw holders which are arranged on either side of the saw blade, can be adjusted relative to one another and can be fitted with clamping jaws.

A device for setting saw blades within the meaning of the present invention is preferably a setting machine and most preferably a setting machine having a clamping device. Saw blades within the meaning of the present invention comprise circular saw blades and oblong saw blades, in particular saw bands. Within the meaning of the present invention, clamping is identical to holding.

Setting machines are generally known in prior art. A setting machine of the type mentioned at the outset is, for example, described in the published patent application DE 199 59 458 A1. In the case of this setting machine, the saw set holders carrying the saw sets are displaced on a circular swivel track and the clamping jaw holders carrying the clamping jaws are brought closer to the saw blade in a linear movement. The drive unit of the described setting machine primarily drives the setting device and secondarily the clamping device, the driving forces of the drive unit being transmitted from the setting device onto the clamping device by means of a rack and pinion gear. A disadvantage of this setting machine is that the saw blade is clamped by means of a complex, multipart gear such that a clamping force for clamping the saw blade is limited.

It is therefore the object of the present invention to provide a device for setting saw blades of the type mentioned at the outset, which device securely clamps the saw blade.

To achieve this object, the present invention proposes a device for setting saw blades of the type mentioned at the outset, the clamping jaw holders being designed to be pivotable relative to one another. The pivotable arrangement of the clamping jaw holders replaces the linear arrangement of the clamping jaw holders according to prior art to great advantage. The pivotable clamping jaw holders are mounted by means of pivot bearings in a stable and low-wearing manner. A rack and pinion gear, which is multipart and therefore limits the clamping force, is obsolete. The setting machine according to the invention is therefore ideally suited to securely clamping the saw blade, which has a positive effect on the setting quality.

A further embodiment of the present invention provides that the clamping jaw holders are designed only to be pivotable relative to one another. In the case of a purely pivotable arrangement of the clamping jaw holders, the advantages described above take effect best.

In a general embodiment of the present invention, the clamping jaw holders are designed to be pivotable about axles that are parallel to one another. Two axles that are parallel to one another normally require two bearings; however, potential tilted positions of the clamping jaw holders relative to the saw blade can be compensated better, in particular in the case of larger pivot angles and/or saw blade thicknesses, in that the parallel axles are spaced apart accordingly.

In a more specific embodiment of the present invention, the clamping jaw holders are designed so as to be pivotable about a common axle. One axle only requires one bearing, such that the device can be kept structurally simple. Furthermore, a central axle allows a more accurate adjustment of the clamping jaws to the saw blade. For this purpose, the axle is preferably arranged centrally underneath the saw blade.

In a particularly advantageous embodiment of the present invention, the device comprises a gear acting between the setting device and the clamping device, the gear having the following components: a disc cam, which is fastened to the saw set holder; a shaft, which is rotatably mounted in the housing; a crank, which is connected to the shaft in a torque-proof manner on one side and to a scanning roller in a freely rotating manner on the other side, the scanning roller being designed to be adjacent to the disc cam; and an eccentric, which is connected to the shaft in a torque-proof manner on one side and is operatively connected to the clamping jaw holder on the other side. The aforementioned components of the gear are all mechanical components that can be constructed so as to be stable in order to be able to provide large clamping forces for the clamping device without wear. In this embodiment, the drive unit primarily drives the setting device and the setting device being driven by the drive unit secondarily drives the clamping device. In other words, the drive unit drives the setting device and the clamping device, the setting device being inserted between the drive unit and the clamping device. There is no separate drive unit for the clamping device. The common drive unit for the setting device and the clamping device allows a simplified and therefore cost-effective construction of the setting machine according to the invention. Furthermore, the common drive allows a precise adjustment of the setting device and the clamping device that is less prone to errors, such that consecutive setting cycles can be clocked close together in time, which is ultimately the basis for a high saw blade feed per unit of time.

A very advantageous development of the present invention provides that the shaft and the eccentric are formed integrally as an eccentric shaft. The eccentric shaft combines two components in one, which again simplifies the construction of the device according to the invention and makes it more resistant to malfunction.

In a particularly advantageous embodiment of the present invention, the disc cam is designed so as to have a varying radius in a first region of the disc cam and to retain its radius in a second region of the disc cam. It is generally the case that a form of the disc cam is the controlling element in the gear to adjust a clamping movement to a setting movement. The disc cam is preferably designed so as to have a declining radius in the first region. Over the course of the setting movement, in particular before the actual setting begins, the scanning roller first scans the first region. This leads to an adjustment or even provision of the clamping jaws on the saw blade and for clamping the saw blade. The saw blade is firmly clamped at a transition from the first region to the second region. While the actual setting is taking place subsequently, the scanning roller scans the second region. This leads to an even maintenance of the clamping of the saw blade. Other types of combined clamping and setting processes can be achieved using alternative forms of the disc cam.

In a further embodiment of the present invention, the device has an eccentric bushing arranged between the shaft and the clamping jaw holder. The eccentric bushing serves to transform a rotational movement of the shaft, which would lead to a vertical bracing of the clamping jaw holder fastened to the axle due to the eccentric, into a pivotal movement of the clamping jaw holder extending almost horizontally on a circular path, in order to provide a clamping force that is orientated as horizontally as possible without substantially vertical force components. Alternatively, the eccentric bushing can be orientated such that a slightly downwards orientated clamping force results in order to provide a downward pull for the saw blade to be clamped. Most preferably, a bearing is arranged in each case between the shaft and the eccentric bushing and between the eccentric bushing and the clamping jaw holder in order to reduce frictional forces that occur there. The bearings are preferably needle bearings.

A very advantageous embodiment of the present invention provides that the device has an eccentric bushing arranged between the shaft and the housing. Due to the eccentricity of the eccentric bushing, a mounting position of the shaft in the housing can be adjusted depending on the orientation of the eccentric bushing relative to the housing. Since the eccentricity is slight, the eccentric bushing is designed so as to be self-retaining with respect to its orientation in the housing.

In a preferred development of the present invention, the eccentric bushing is connected to a further eccentric bushing by means of an eccentric-like restricted guide for rotating the further eccentric bushing of the device, the further eccentric bushing being arranged on a further shaft of the device. The restricted guide couples the mounting positions of the two shafts in particular such that while a mounting position is being set, both shafts are positioned simultaneously and mirror symmetrically to a central plane of the housing in order to be able to clamp the saw blade in the central plane of the housing. Preferably, the restricted guide is an S-shaped rod, which is connected on one side eccentrically to the shaft and on the other side eccentrically to the further shaft.

In a further embodiment of the present invention, the device has a continuously adjustable rod system that can be locked in two locking positions for defining a gap between the shaft and the further shaft, the rod system being connected to the eccentric bushing which is arranged between the shaft and the housing. The continuous adjustability of the rod system is achieved in particular by an adjusting nut arranged on a threaded portion of the rod system and allows an adjustment of the clamping device to different saw blade thicknesses. Furthermore, the clamping device is therefore designed in an adjustable manner in relation to a clamping force of the clamping device. The rod system is actuated by means of a lever. A spring-powered bolt stops the rod system either in a mounting position of the device or in an open position of the device. In the mounting position, the clamping jaws are spaced as far apart from one another that the saw blade can easily be inserted into the clamping device. In the open position, the clamping jaws are arranged closer to the inserted saw blade but without clamping the saw blade. In contrast to this, the saw blade is clamped between the clamping jaws in a clamping position of the device.

Another embodiment of the present invention provides that the device has a return device which acts between the shaft and the housing and is designed to return the clamping jaw holder into an open position of the device. In particular, the device comprises two return devices, one return device being assigned to each of the clamping jaw holders. In order to clamp the saw blade, the clamping jaws are actively moved towards the saw blade indirectly and against a resistance of the return devices by means of the drive unit. When the saw blade is clamped, a clamping position of the device occurs. The device is returned into the open position to release the saw blade by means of the return devices, which have been pre-tensioned during the clamping process and splay the clamping jaws apart following the reversing of the drive unit. Each of the return devices preferably comprises a compression spring.

An advantageous development of the present invention provides that the device has securing means, which are designed to connect to the clamping jaw holders and secure them against falling apart. The securing means preferably have a threaded rod, bushings and disc spring sets arranged thereon and a quick action lock and are therefore a structurally simple assembly in order to hold the clamping jaw holders, which would otherwise be arranged loosely in the housing and be pivotable about the axle, in their predetermined position. The securing means form a stop to limit the open position of the device. Furthermore, the axle bolts forming the axle can be replaced simply and quickly by means of the securing means, which have a quick action lock. After opening the quick action lock, the axle bolts are only secured in the housing by means of resilient retaining rings.

In a very advantageous embodiment of the present invention, the device has a strain gauge. By means of the strain gauge, a deformation of the device can be measured. This can on the one hand measure and control the clamping forces and on the other hand function as overload protection for the device if the clamping forces exceed a predetermined maximum value. The strain gauge is preferably attached to the housing.

Furthermore, a preferred embodiment of the present invention provides that at least parts or regions of the clamping device, which come into contact with the saw blade, consist of a material having a hardness greater than 30 HRC. Parts or regions that are hardened in this manner, for example the clamping jaws or surfaces of the clamping jaws, are expedient in order to reduce or totally prevent wear of the clamping device, which would otherwise occur. The hardness of the material is preferably 50 HRC or 60 HRC.

The device according to the invention for setting saw blades allows a setting angle of the device greater than 15°. The setting angle is regularly about 20° and can be up to 45° in an extreme case. A clamping region of the device for setting saw blades is about 0.6 mm to 1.6 mm, the clamping region being the difference between the gap of the clamping jaws in the open position of the device and the clamping position of the device. The clamping region taken up is optimal with respect to an adequate release of the saw blade in the open position of the device on the one hand and a sufficiently rapid movement of the clamping jaws onto the saw blade on the other hand. Furthermore, the device according to the invention for setting saw blades allows a saw blade feed of the device of greater than 10 m/min. In particular, the saw blade feed can be up to 20 m/min.

In a very advantageous embodiment of the present invention, the drive unit is designed as an electromechanical drive unit. In contrast to hydraulic or pneumatic drive units, which work via a continuous build-up of pressure, the electromechanical drive unit is very agile in the sense of less sluggish and therefore provides the predetermined clamping force right from the start of clamping in order to clamp the saw blade sufficiently.

It proves to be particularly advantageous according to the invention that the drive unit can have a toothed belt for transmitting drive forces from a servomotor to the setting device. The electrical servomotor provides a rapid response to control signals and sufficiently large drive forces.

Depending on the selection of a toothed belt wheel combination for the toothed belt, the drive forces can be transmitted or reduced. Preferably, a toothed belt wheel is formed annularly on the saw setting device side, the saw blade to be set being transported through an open inside of the annular toothed belt wheel.

A preferred embodiment of the invention is described with reference to the drawings by way of example. Further advantageous details are to be taken from the drawings, in which in detail:

Figure 1:
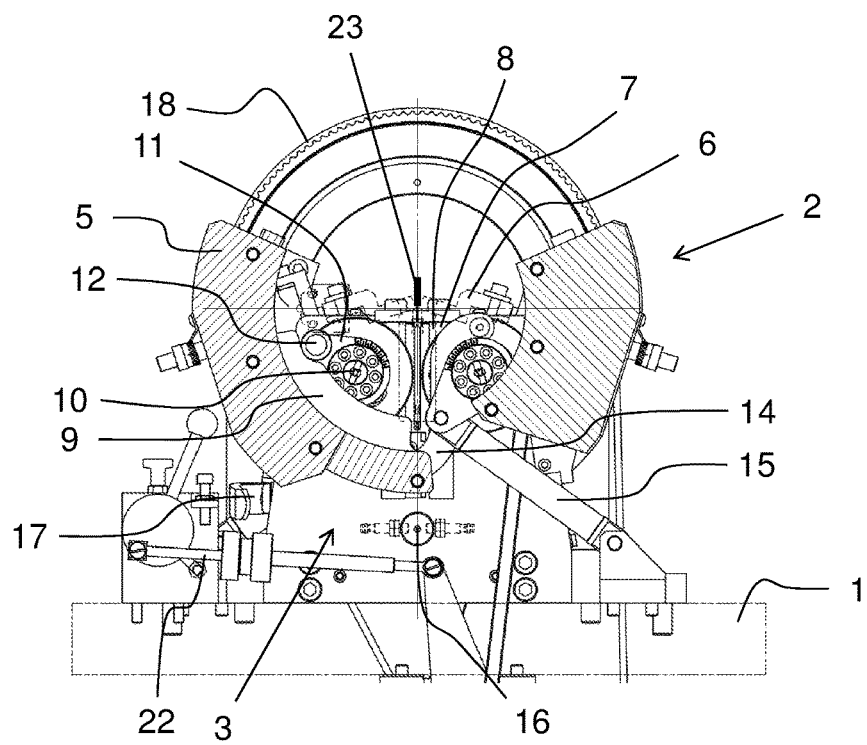
FIG. 1 is a vertical sectional view of a device for setting saw blades according to the present invention, in an open position of the device.

FIG. 1 is a vertical sectional view of a device for setting saw blades according to the present invention in an open position of the device. In the open position, the saw blade, which is not shown, is not clamped. The device serves to set saw blades and comprises a housing 1, which is designed as an open support frame in the present case, a setting device 2 connected to the housing 1 for setting a saw blade 23, a clamping device 3 connected to the housing 1 for clamping the saw blade and a drive unit 4 connected to the housing 1 for driving the setting device 2 and the clamping device 3, the drive unit 4 not being shown in FIG. 1. The setting device 2 has saw set holders 5 which are arranged on either side of the saw blade 23, are pivotable relative to one another and are fitted with saw sets 6. The clamping device 3 has clamping jaw holders 7 which are arranged on either side of the saw blade 23, can be adjusted relative to one another and are fitted with clamping jaws 8. It is essential to the invention that the clamping jaw holders 7 are designed so as to be pivotable relative to one another. In particular, the clamping jaw holders 7 are designed only to be pivotable relative to one another and specifically about a common axle 16, which is provided by two axle pins. A disc cam 9 is fastened to the saw set holder 5 and is scanned by a scanning roller 12. The disc cam 9 is designed so as to change radius in a first region of the disc cam 9 and to retain its radius in a second region of the disc cam 9.

Figure 2:
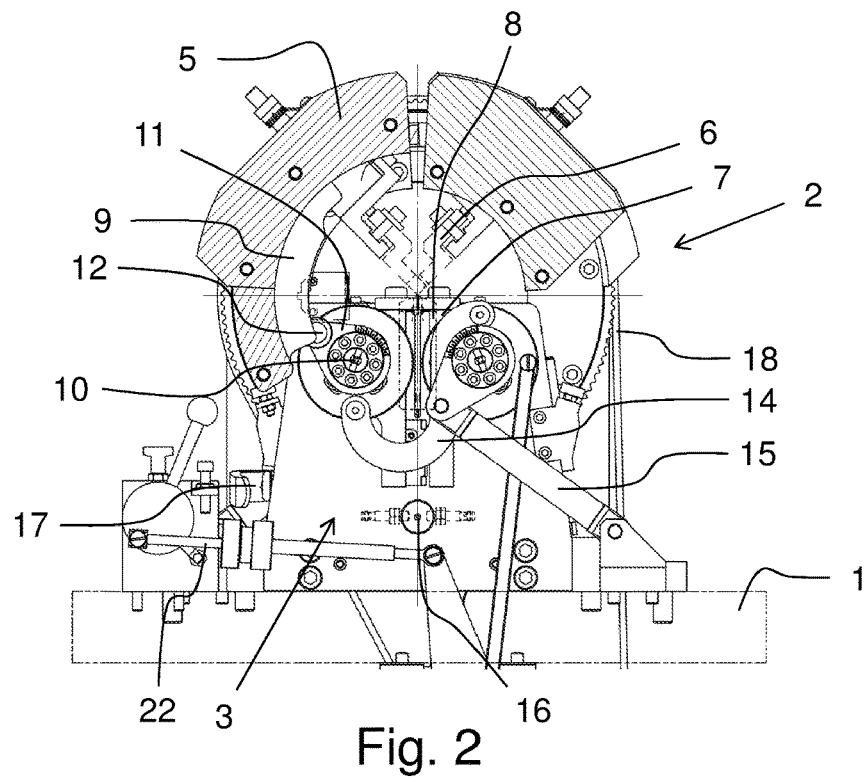
FIG. 2 is a vertical sectional view of the device for setting saw blades according to the present invention, in a clamping position of the device.

FIG. 2 is a vertical sectional view of the device for setting saw blades according to the present invention, in a clamped position of the device. In the clamped position, the saw blade, which is not shown, is clamped. Furthermore, the saw set holders 5 holding the saw sets 6 are located in a setting position 1; a setting angle of the device here is 45°.

Figure 3:
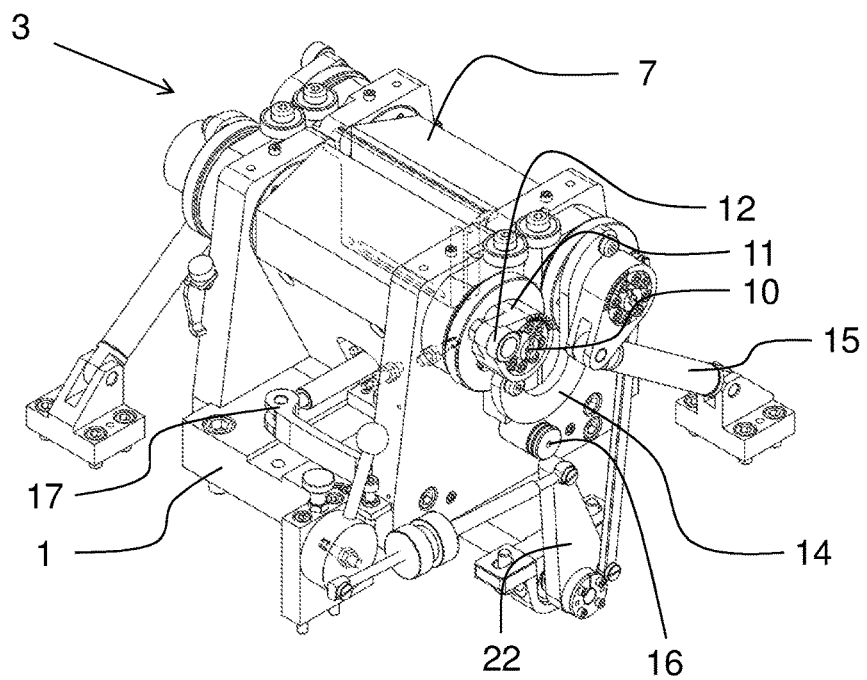
FIG. 3 is a perspective view of a clamping device of the device for setting saw blades according to the present invention.

FIG. 3 is a perspective view of a clamping device 3 of the device for setting saw blades according to the present invention. To operate the clamping device 3, the device has a gear acting between the setting device 2 and the clamping device 3. The gear has the following components: a disc cam 9, which is fastened to the saw set holder 5 (see FIG. 1 and FIG. 2 in this regard); a shaft 10, which is rotatably mounted in the housing 1; a crank 11, which is connected to the shaft 10 in a torque-proof manner on one side and to a scanning roller 12 in a freely rotating manner on the other side, the scanning roller 12 being designed so as to be adjacent to the disc cam 9; and an eccentric 13, which is not shown in FIG. 3 and is connected to the shaft 10 in a torque-proof manner on one side, which here in particular is formed integrally with the shaft 10 in order to form an eccentric shaft, and is operatively connected to the clamping jaw holder 7 on the other side. The shaft 10 is mounted in the housing 1 by means of an eccentric bushing 21 (see in particular FIG. 6). The eccentric bushing 21 is connected to a further eccentric bushing by means of an eccentric-like restricted guide 14 for rotating the further eccentric bushing of the device, the further eccentric bushing being arranged on a further shaft of the device. Furthermore, the device has a continuously adjustable rod system 22 that can be locked in two locking positions for defining a gap between the shaft 10 and the further shaft. The rod system 22 is connected to the eccentric bushing 21 and can be operated using a lockable lever. A return device 15 is arranged to act between the shaft 10 and the housing 1 and is designed to return the clamping jaw holder 7 into an open position of the device. For this purpose, the return device 15 has a compression spring. The device has securing means 17 which are designed to connect to the clamping jaw holders 7 and secure them against falling apart. The securing means 17 comprise a quick action lock and bushings and disc springs arranged on a threaded rod, which provide flexible stops for the clamping jaw holders 7. The device has a strain gauge (not shown in FIG. 3) on the housing 1. The clamping jaws 8 held by the clamping jaw holders 7 are surface hardened and have a hardness of about 60 HRC there.

Figure 4:
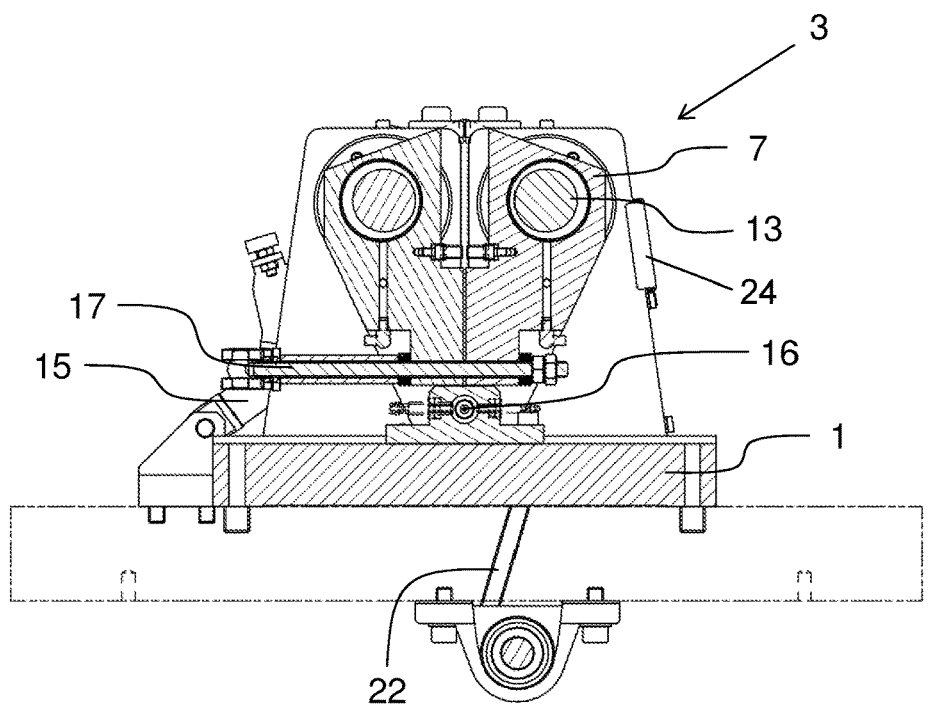
FIG. 4 is a vertical sectional view of the clamping device of the device for setting saw blades according to the present invention.

FIG. 4 is a vertical sectional view of the clamping device 3 of the device for setting saw blades according to the present invention. The sectional view reproduces the clamping device 3 at the height of the centre of the housing 1. In the housing 1, the clamping jaw holders 7 are arranged pivotably about the common axle 16, which is formed by two axle pins, and are secured by the securing means 17 against falling apart. The eccentric 13, which is formed integrally with the shaft 10 in order to provide an eccentric shaft, can easily be seen. No clamping jaws 8 have been inserted into the clamping jaw holders 7. Strain gauge 24 attached to housing 1 measures the deformation of the device. The strain gauge 24 can on the one hand measure and control the clamping forces and on the other hand function as overload protection for the device if the clamping forces exceed a predetermined maximum value.

Figure 5:
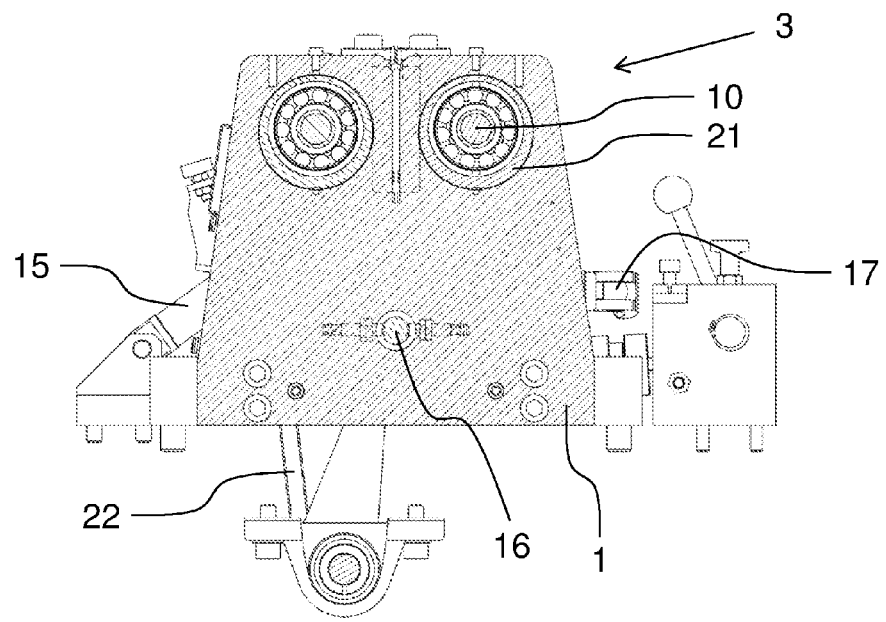
FIG. 5 is a further vertical sectional view of the clamping device of the device for setting saw blades according to the present invention.

FIG. 5 is a further vertical sectional view of the clamping device 3 of the device for setting saw blades according to the present invention. This sectional view reproduces the clamping device 3 at the height of a housing wall of the housing 1. The eccentric bushing 21, which is arranged in the housing 1 and in which the shaft 10 is mounted by means of a cylindrical roller bearing, can be clearly seen.

Figure 6:
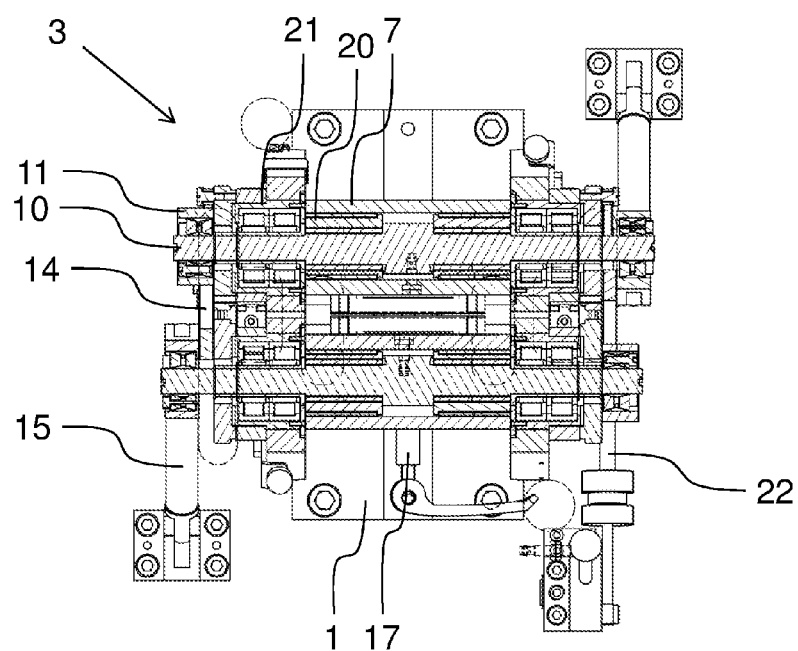
FIG. 6 is a horizontal sectional view of the clamping device of the device for setting saw blades according to the present invention.

FIG. 6 is a horizontal sectional view of the clamping device 3 of the device for setting saw blades according to the present invention. Here too, no clamping jaws 8 have been inserted into the clamping jaw holders 7. The clamping device 3 has clamping jaw holders 7 which are arranged on either side of the saw blade, can be adjusted relative to one another and can be fitted with clamping jaws 8. The eccentric shaft consisting of the shaft 10 and the eccentric 13 is basically a cam shaft, which adjusts the clamping jaws 8 to the saw blade depending on their orientation.

Furthermore, with respect to the gear according to the invention, the shaft 10, which is mounted in the housing 1 by means of cylindrical roller bearings, and the crank 11, which is connected to the shaft 10 in a torque-resistant manner, are shown. The device has an eccentric bushing 20 arranged between the shaft 10 and the clamping jaw holder 7, and an eccentric bushing 21 arranged between the shaft 10 and the housing 1, both types of eccentric bushing 20, 21 being provided twice for each shaft 10. In addition, the device has a return device 15 which acts between the shaft 10 and the housing 1 and is designed to return the clamping jaw holder 7 into an open position of the device, and securing means 17 which are designed to connect the clamping jaw holders 7 and secure them against falling apart. The clamping jaw holder 7, the clamping jaw 8, the shaft 10, the crank 11, the scanning roller 12, the eccentric 13, the restricted guide 14 and the return device 15 are provided twice in the device according to the invention, said components in each case being arranged symmetrically with respect to one another.

Figure 7:
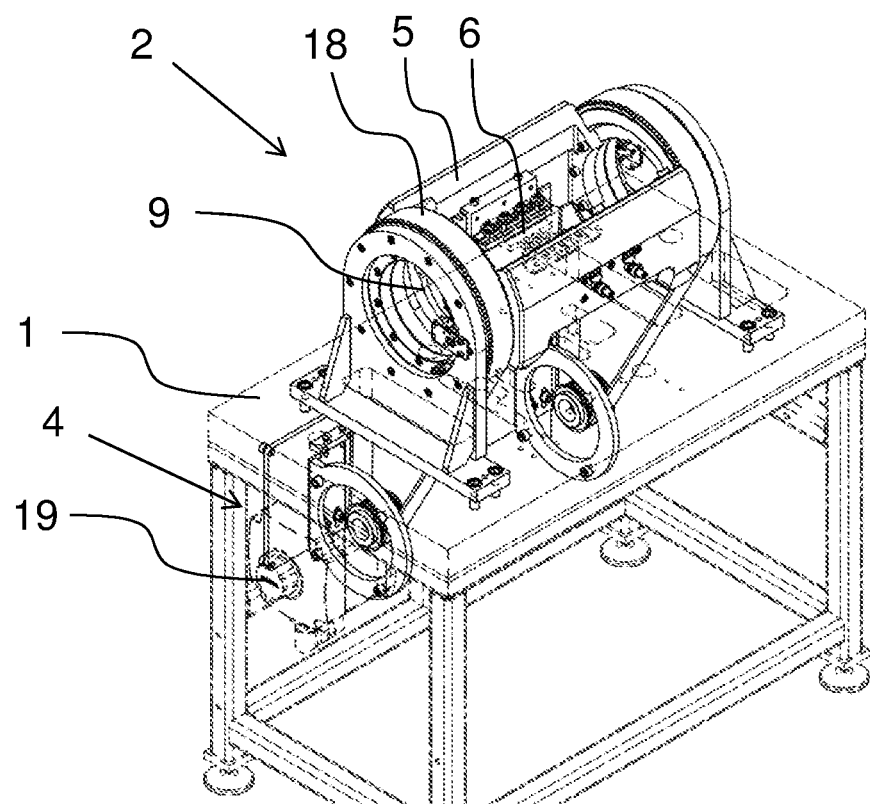
FIG. 7 is a perspective view of a setting device of the device for setting saw blades according to the present invention.

FIG. 7 is a perspective view of a setting device 2 of the device for setting saw blades according to the present invention. The setting device 2, which is connected to the housing 1 designed as an open support frame, has saw set holders 5 which are arranged on either side of the saw blade, are pivotable relative to one another and are fitted with saw sets 6. In addition to the setting device 2 and the clamping device 3, which is not shown in FIG. 7, the device for setting saw blades has a drive unit 4 connected to the housing 1 for driving the setting device 2 and the clamping device 3. The drive unit 4 is designed as an electromechanical drive unit and comprises a servomotor 19 and a toothed belt 18 for transmitting drive forces onto the setting device 2. The saw blade, which is not shown in FIG. 7, is transported through an open inside of an annular toothed belt wheel on the side of the setting device, via which the toothed belt 28 runs. The saw set holder 5, the saw set 6, the disc cam 9, the toothed belt 18 and the servomotor 19 are provided twice in the device according to the invention, said components in each case being arranged symmetrically with respect to one another.

LIST OF REFERENCE NUMERALS

1 Housing
2 Setting device
3 Clamping device
4 Drive unit
5 Saw set holder
6 Saw set
7 Clamping jaw holder
8 Clamping jaw
9 Disc cam
10 Shaft
11 Crank
12 Scanning roller
13 Eccentric
14 Restricted guide
15 Return device
16 Axle
17 Securing means
18 Toothed belt
19 Servomotor
20 Eccentric bushing
21 Eccentric bushing
22 Rod system
23 Saw blade
24 Strain gauge

The invention claimed is:

1. Device for setting saw blades, comprising: a housing (1); a setting device (2) connected to the housing (1) for setting a saw blade; a clamping device (3) connected to the housing (1) for clamping the saw blade; and a drive unit (4) connected to the housing (1) for driving the setting device (2) and the clamping device (3), the setting device (2) having saw set holders (5) which are arranged on either side of the saw blade, are pivotable relative to one another and can be fitted with saw sets (6), and the clamping device (3) having clamping jaw holders (7) which are arranged on either side of the saw blade, are adjustable relative to one another and can be fitted with clamping jaws (8), wherein the clamping jaw holders (7) are only pivotable relative to one another, and are one of: pivotable about axles that are parallel to one another; or are pivotable about a common axle (16).

2. Device for setting saw blades according to claim 1, wherein the device comprises a gear acting between the setting device (2) and the clamping device (3), wherein the gear has the following components: a disc cam (9), which is fastened to the saw set holder (5); a shaft (10), which is rotatably mounted in the housing (1); a crank (11), which is rotatably fixed to the shaft (10) manner on one side and to a scanning roller (12) in a freely rotating manner on the other side, wherein the scanning roller (12) is designed so as to be adjacent to the disc cam (9); and an eccentric (13), which is connected to the shaft (10) in a torque-proof manner on one side and is operatively connected to the clamping jaw holder (7) on the other side.

3. Device for setting saw blades according to claim 2, wherein the shaft (10) and the eccentric (13) are formed integrally as an eccentric shaft.

4. Device for setting saw blades according to claim 2, wherein the disc cam (9) is designed so as to have a varying radius in a first region of the disc cam (9) and to retain its radius in a second region of the disc cam (9).

5. Device for setting saw blades according to claim 2, wherein the device has an eccentric bushing (20) arranged between the shaft (10) and the clamping jaw holder (7).

6. Device for setting saw blades according to claim 2, wherein the device has an eccentric bushing (21) arranged between the shaft (10) and the housing (1).

7. Device for setting saw blades according to claim 6, wherein the eccentric bushing (21) is connected to a further eccentric bushing by means of an eccentric-like restricted guide (14) for rotating the further eccentric bushing of the device, wherein the further eccentric bushing is arranged on a further shaft of the device.

8. Device for setting saw blades according to claim 7, wherein the device has a continuously adjustable rod system (22), which can be locked in two locking positions for defining a gap between the shaft (10) and the further shaft, wherein the rod system (22) is connected to the eccentric bushing (21).

9. Device for setting saw blades according to claim 2, wherein the device has a return device (15) which acts between the shaft (10) and the housing (1) and is designed to return the clamping jaw holder (7) into an open position of the device.

10. Device for setting saw blades according to claim 1, wherein the device has securing means (17), which connect the clamping jaw holders (7) and secure them against coming apart.

11. Device for setting saw blades according to claim 1, characterised in a wherein the device has a strain gauge.

* * * * *